March 16, 1954  T. F. SARAH  2,672,217
AUTOMATIC FISHING REEL
Filed July 7, 1952  2 Sheets-Sheet 1
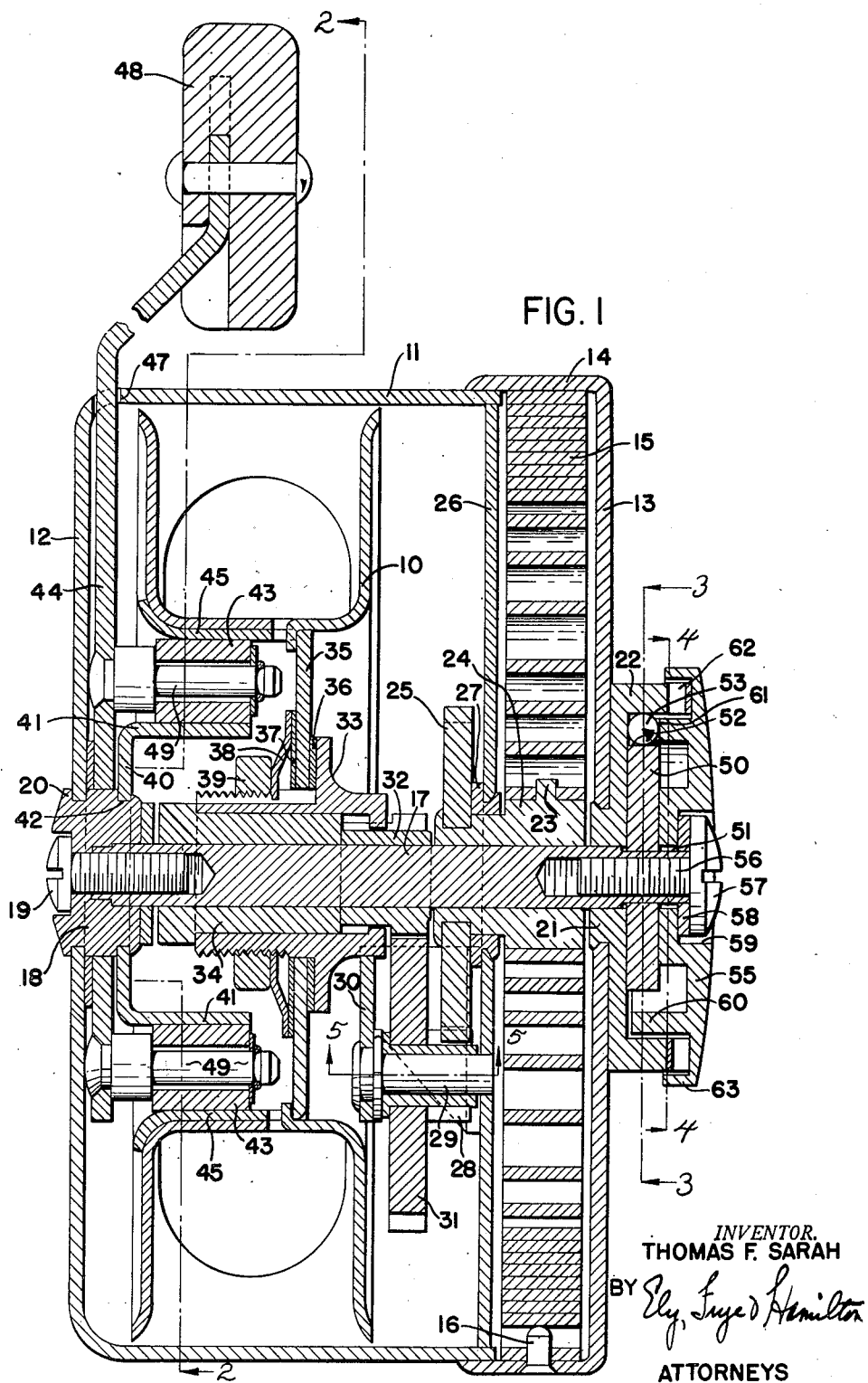
FIG. I
INVENTOR.
THOMAS F. SARAH
BY
ATTORNEYS March 16, 1954     T. F. SARAH     2,672,217
AUTOMATIC FISHING REEL
Filed July 7, 1952     2 Sheets-Sheet 2
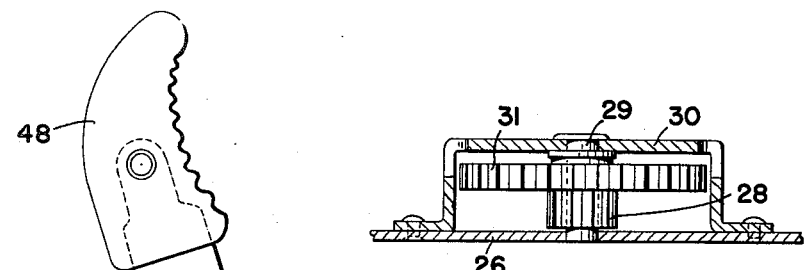
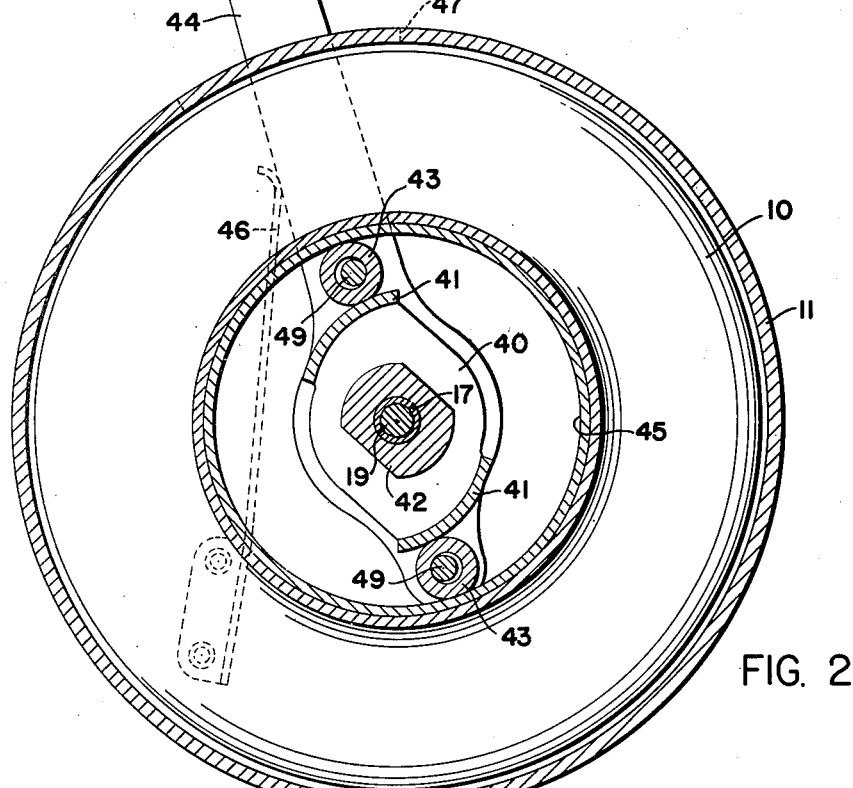
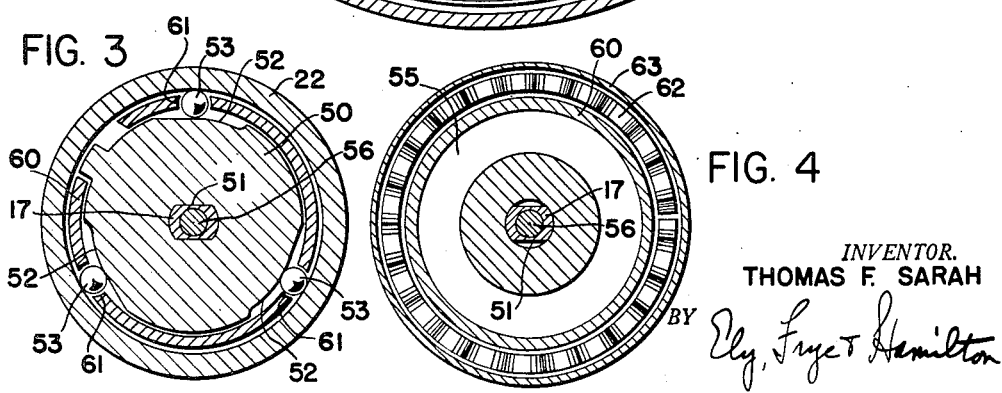
INVENTOR.
THOMAS F. SARAH Patented Mar. 16, 1954

2,672,217

UNITED STATES PATENT OFFICE 2,672,217

AUTOMATIC FISHING REEL

Thomas F. Sarah, Akron, Ohio, assignor to The Enterprise Manufacturing Company, Akron, Ohio, a corporation of Ohio Application July 7, 1952, Serial No. 297,497

11 Claims. (Cl. 185—37)

The invention relates generally to improvements in automatic spring-driven fishing reels, and more particularly to improved ratchet mechanism for the power spring driving the reel.

Automatic fishing reels embody a power spring which is selectively operated by clutch or brake means to take up slack in the line, the clutch means being adapted to allow stripping the line by hand whenever desired. The power spring is wound from time to time, and a ratchet device is provided for holding the spring. Various kinds of ratchet devices have been used for this purpose including torsion springs which wrap around the shaft and ratchet pawl and wheel combinations.

It is desirable to provide for releasing the ratchet device momentarily or completely as the fisherman may wish to reduce or release the spring tension during fishing to suit certain conditions. Prior ratchet devices have been awkward to locate and manipulate while the reel and rod are held in position for fly fishing, and it is an object of the present invention to provide an improved ratchet mechanism which is extremely convenient and effective in operation at all times.

Other objects are generally to improve the construction and operation of automatic reels, and to provide an improved ratchet mechanism which is inexpensive and subject to substantially no wear during long periods of use.

A preferred form of reel embodying the present invention is shown and described herein, but it is to be understood that various changes in details and modifications in construction may be made without departing from the scope of the invention as defined in the appended claims.

Referring to the drawings forming part hereof:

Fig. 1 is an enlarged transverse sectional view of an automatic fishing reel embodying the invention, Fig. 2 is a sectional view on a reduced scale, as on line 2—2, Fig. 1;

Fig. 3 is a fragmentary reduced sectional view on line 3—3, Fig. 1;

Fig. 4 is a fragmentary reduced sectional view on line 4—4, Fig. 1; and

Fig. 5 is a fragmentary reduced sectional view on line 5—5, Fig. 1.

Similar numerals refer to similar parts throughout the drawings.

In the drawings the reel spool 10 is shown mounted within a casing 11 having a wall 12 closing one end. A cup-shaped spring casing or winding drum is rotatably mounted on the other end of casing 11 and includes an end wall 13 and a peripheral flange 14 which overlaps the edge of the casing 11. The flange 14 is secured to the outer end of a spiral power spring 15 by a screw or rivet 16, and the outer surface of the flange 14 may be knurled to facilitate turning it to wind the spring.

The shaft 17 on which the reel spool is journaled is non-rotatively secured at one end in a bushing 18 by means of a screw 19 threaded into the end of the shaft, the bushing being preferably swaged over the edge of an opening in the end wall 12 of the housing, as indicated at 20, in a usual manner. The other end of the shaft 17 is mounted in bushing 21 swaged into an opening in the end wall 13 of the spring case, and the bushing 21 has an external, cup-shaped portion including an annular flange 22 forming part of the ratchet device for the power spring, as will later be described.

The inner end of the power spring 15 slips over a stud 23 on a bushing 24 journaled on shaft 17, for driving the bushing, and a gear 25 is swaged or otherwise fixed on the outer end of the bushing. As shown, a partition wall 26 may be provided in the casing 11 adjacent the spring 15, and the partition wall is carried on a collar 27 journaled on the bushing 24 between the spring and the gear 25. The gear 25 meshes with a pinion 28 journaled on a stub shaft 29 mounted at one end in the partition wall 26 and at the other end in a bracket 30 carried on said wall (Fig. 5). The pinion 28 has a gear 31 splined on one end and meshing with a pinion 32 journaled on the shaft 17.

One end of pinion 32 has a splined connection with a friction clutch member 33 journaled on a bushing 34 and frictionally contacting one side of the web 35 of the reel spool 10 by means of a friction washer 36. The other side of the web is contacted by a friction washer 37 backed up by a dished resilient disk member 38. The amount of frictional resistance between the friction surfaces may be adjusted by a thrust nut 39 abutting disk 38, so as to allow slippage of the reel under an extreme pull on the line before the line breaks. Thus the power spring 15 drives the reel spool to wind the line thereon through gears 25, 28, 31, 32 and friction members 33, 36 and 37.

A roller brake is provided for stopping rotation of the spool in the direction to wind the line and permitting free rotation in the opposite direction to unwind the line. The brake includes a cam member 40 having curved cam flanges 41 spaced radially inward of the spool rim, the central part of the cam member having a flat sided opening secured on a flatted portion 42 of the bushing 18. A pair of diametrically opposite rollers 43 are mounted on a brake lever 44 journaled on bushing 18, said rollers being located between the cam flanges 41 and the inner rim member 45 of the spool. The lever 44 is normally urged in a clockwise direction, as viewed in Fig. 2, toward the wedging or locking position of the rollers between the cams and spool flange, by means of a flat spring 46 which may be mounted on the end wall 12 of the casing. The outer end of the lever 44 extends through a slot 47 in the casing and is preferably provided with a finger pad 48, which when pressed on the concave side will rotate the lever against the pressure of the spring 46 and free the rollers 43 from locking engagement between the cams 41 and rim 45, the loose journals of the rollers on their shafts 49 permitting disengagement of the rollers from the rim and free winding of the spool by the power spring 15.

When the spring 15 is wound by turning the drum flange 14, the cup-shaped flange member 22 turns with the casing. Within the member 22 is a cam disk 50 secured on a flatted portion 51 of shaft 17 and having a series of cam notches 52 in its outer periphery, three being shown. Balls 53 are located in the cam notches and roll on the inner cylindrical surface of the flange 22. The notches 52 are so shaped that when the flange 22 rotates in one direction (clockwise in Fig. 3) the balls allow free rotation of the flange 22 and hence winding of the spring, but when flange turns a very slight amount in the opposite direction tending to unwind the spring, the balls immediately wedge between the cam notches 52 and the flange 22 as can be clearly seen in Fig. 3.

The novel means for controlling the balls 53, to release the spring tension at any time, preferably includes a cap 55 secured on the outer end of the flatted portion 51 of shaft 17 by means of a screw 56 threaded into the end of the shaft. The head 57 of the screw fits over a washer 58 into a recess 59 in the cap and the central portion of the cap abuts the face of the cam disk 50. An annular flange 60 concentric with outer flange 22 is provided on the underside of the cap registering with the annular space between the cam disk 50 and the outer flange 22, and the flange 60 has pockets or slots 61 fitting over the balls. Hence clockwise manual rotation of the cap 55 at any time will free the balls from locking engagement with flange 22 and allow unwinding of the spring. Around the outer edge of the flange 60 an annular spring strip 62 of wavy contour is positioned in a groove formed by a rim flange 63 for engaging the flange 22 of the ratchet to yieldingly restrain turning of the cap 55. Preferably, the flange 60 is slightly peened over the balls 53 at the edges of the slots 61 to retain the balls in place if the cap is removed.

In the operation of the improved reel, as the power spring is wound, the ratchet device in flange member 22 locks the spring after each turn, and rotation of the spool 10 is prevented by the brake rollers 43 held in locking engagement between the spool and the cams 41 by the spring 46 engaging the lever 44. After the power spring has been sufficiently wound, the line may be stripped by hand from the reel because an unwinding pull on the line will rotate the spool 10 counterclockwise as viewed in Fig. 2, and roll the rollers 43 away from the high points of the cams 41 to free the spool momentarily each time the line is stripped. The reel is used in casting in an obvious and well known manner, and if it be desired to relieve the tension on the power spring at any time without rotating the spool, a slight turn of the cap will release the balls and allow the spring to unwind. By holding the cap in ball-releasing position, the spring will continue to unwind until all its energy is dissipated, but if it is desired merely to reduce the spring tension, the cap is turned only momentarily.

The position and size of the cap makes it very convenient for the fisherman to locate at any time without delay, and the releasing action comes natural while holding the reel in casting position, without requiring a shift of position or awkward changing of the hands. Moreover, the locking feature of the balls as well as that of the rollers on the spool brake involves a negligible amount of wear on the working parts, with the result that the reel can be used for long periods without requiring repair.

What is claimed is:

1. In an automatic spring wind reel having a spool shaft, a driving spring operatively associated with a spool on the spool shaft, and a winding drum rotatable on the shaft and connected to the spring, a cup-shaped ratchet member rotatable on the shaft with said drum, a cam disk fixed on the shaft within the ratchet member and having cam notches in its outer periphery, balls in the cam notches allowing rotation of the ratchet member in one direction and locking it against rotation in the other direction, a cap rotatable on the cam disk, and an annular flange on the cap having slots containing said balls for shifting the balls to free the ratchet member.

2. In an automatic spring wind reel having a spool shaft, a driving spring operatively associated with a spool on the spool shaft, and a winding drum rotatable on the shaft and connected to the spring, a ratchet member rotatable on the shaft with said drum and having an annular rim flange, a cam disk fixed on the shaft within the rim flange and having cam notches in its outer periphery, balls in the cam notches lockingly engaging said annular rim flange against rotation in one direction and releasing it for rotation in the opposite direction, a cap covering said ratchet member and rotatable thereon, and an annular flange on the cap having pockets containing the balls whereby rotation of the cap will shift the balls in the cam notches.

3. In an automatic spring wind reel having a spool shaft, a driving spring operatively associated with a spool on the spool shaft, and a winding drum rotatable on the shaft and connected to the spring, a cup-shaped ratchet member rotatable on the shaft with said drum, a cam disk fixed on the shaft within the ratchet member and having cam notches in its outer periphery, balls in the cam notches allowing rotation of the ratchet member in one direction and locking it against rotation in the other direction, a cap rotatable on the cam disk, an annular flange on the cap having slots containing said balls for shifting the balls to free the ratchet member, and means yieldingly restraining rotation of said cap.

4. In an automatic spring wind reel having a spool shaft, a driving spring operatively associated with a spool on the spool shaft, and a winding drum rotatable on the shaft and connected to the spring, a ratchet member rotatable on the shaft with said drum and having an annular rim flange, a cam disk fixed on the shaft within the rim flange and having cam notches in its outer periphery, balls in the cam notches lockingly engaging said annular rim flange against rotation in one direction and releasing it for rotation in the opposite direction, a cap covering said ratchet member and rotatable thereon, an annular flange on the cap having pockets containing the balls whereby rotation of the cap will shift the balls in the cam notches, and means yieldingly restraining rotation of the cap.

5. In an automatic spring wind reel having a spool shaft, a driving spring operatively associated with a spool on the spool shaft, and a winding drum rotatable on the shaft and connected to the spring, a cup-shaped ratchet member rotatable on the shaft with said drum, a cam disk fixed on the shaft within the ratchet member and having cam notches in its outer periphery, balls in the cam notches allowing rotation of the ratchet member in one direction and locking it against rotation in the other direction, a cap rotatable on the cam disk, an annular flange on the cap having slots containing said balls for shifting the balls to free the ratchet member, an annular rim flange on the cap, and means positioned between the annular flanges of the cap yieldingly engaging the annular flange of the ratchet member for restraining rotation of the cap.

6. In an automatic spring wind reel having a spool shaft, a driving spring operatively associated with a spool on the spool shaft, and a winding drum rotatable on the shaft and connected to the spring, a ratchet member rotatable on the shaft with said drum and having an annular flange, a cam disk fixed on the shaft within the rim flange and having cam notches in its outer periphery, balls in the cam notches lockingly engaging said annular rim flange against rotation in one direction and releasing it for rotation in the opposite direction, a cap covering said ratchet member and rotatable thereon, an inner annular flange on the cap having pockets containing the balls whereby rotation of the cap will shift the balls in the cam notches, an annular rim flange on the cap, and means positioned between the annular flanges of the cap yieldingly engaging the annular flange of the ratchet member for restraining rotation of the cap.

7. In an automatic spring wind reel having a spool casing, a spool shaft extending through the casing, and a spool driving spring and winding drum journaled on the shaft at one end of the casing, a ratchet device on the outer end of the shaft adjacent the winding drum, said ratchet device including an outer annular flange rotatable with said drum, an inner non-rotatable cam member having peripheral cam notches, balls in the cam notches lockingly engaging the outer annular flange against rotation in one direction and releasing it for rotation in the opposite direction, and means rotatively associated with said outer annular flange for manually shifting the position of the balls in said cam notches.

8. In an automatic spring wind reel having a spool casing, a spool shaft extending through the casing, and a spool driving spring and winding drum journaled on the shaft at one end of the casing, a ratchet device on the outer end of the shaft adjacent the winding drum, said ratchet device including an outer annular flange rotatable with said drum, an inner non-rotatable cam member having peripheral cam notches, balls in the cam notches lockingly engaging the outer annular flange against rotation in one direction and releasing it for rotation in the opposite direction, and a cap rotatively mounted on said outer annular flange and having ball guiding flange means concentric therewith for manually controlling the position of the balls in said cam notches.

9. In an automatic spring wind reel having a spool casing, a spool shaft extending through the casing, and a spool driving spring and winding drum journaled on the shaft at one end of the casing, a ratchet device on the outer end of the shaft adjacent the winding drum, said ratchet device including an outer annular flange rotatable with said drum, an inner non-rotatable cam member having peripheral cam notches, balls in the cam notches lockingly engaging the outer annular flange against rotation in one direction and releasing it for rotation in the opposite direction, means rotatively associated with said outer annular flange for manually shifting the position of the balls in said cam notches, and means yieldingly restraining rotation of said shifting means.

10. In an automatic spring wind reel having a spool casing, a spool shaft extending through the casing, and a spool driving spring and winding drum journaled on the shaft at one end of the casing, a ratchet device on the outer end of the shaft adjacent the winding drum, said ratchet device including an outer annular flange rotatable with said drum, an inner non-rotatable cam member having peripheral cam notches, balls in the cam notches lockingly engaging the outer annular flange against rotation in one direction and releasing it for rotation in the opposite direction, a cap rotatively mounted on said outer annular flange and having ball guiding flange means concentric therewith for manually controlling the position of the balls in said cam notches, and means yieldingly restraining rotation of said cap.

11. In an automatic spring wind reel having a spool casing, a spool shaft extending through the casing, and a spool driving spring and winding drum journaled on the shaft at one end of the casing, a ratchet device on the outer end of the shaft adjacent the winding drum, said ratchet device including an outer annular flange rotatable with said drum, a cam disk fixed on the shaft within said outer annular flange and having cam notches in its outer periphery, balls in the cam notches lockingly engaging the outer annular flange against rotation in one direction and releasing it for rotation in the opposite direction, a cap rotatively mounted on the outer end of the shaft, a ball guiding annular flange on the cap having pockets containing said balls, a rim flange on the cap forming a groove adjacent the outer annular flange of the ratchet device and spring means in said groove yieldingly restraining rotation of the cap relative to said outer annular flange.

THOMAS F. SARAH.

References Cited in the file of this patent

UNITED STATES PATENTS

| Number | Name | Date |
|---|---|---|
| 823,761 | Carleton | June 19, 1906 |
| 2,124,634 | Russell | July 26, 1938 |
| 2,145,474 | Burdick | Jan. 31, 1939 |
| 2,413,045 | Hockstra | Dec. 24, 1946 |

FOREIGN PATENTS

| Number | Country | Date |
|---|---|---|
| 255,076 | Italy | Dec. 17, 1925 |
| 898,048 | France | Apr. 9, 1945 |